Aug. 26, 1958  D. S. SWARTHOUT  2,849,060
TREAD COMPRESSING TYPE TIRE BEAD SEATING TOOL
Filed Feb. 17, 1955
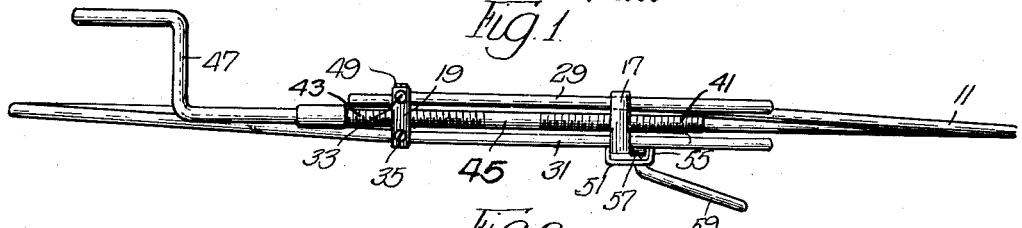
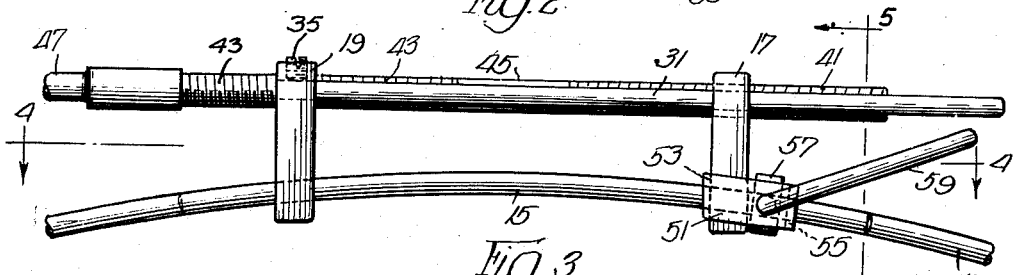
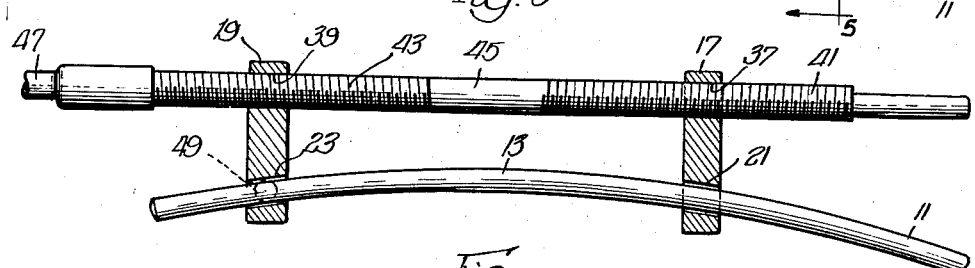
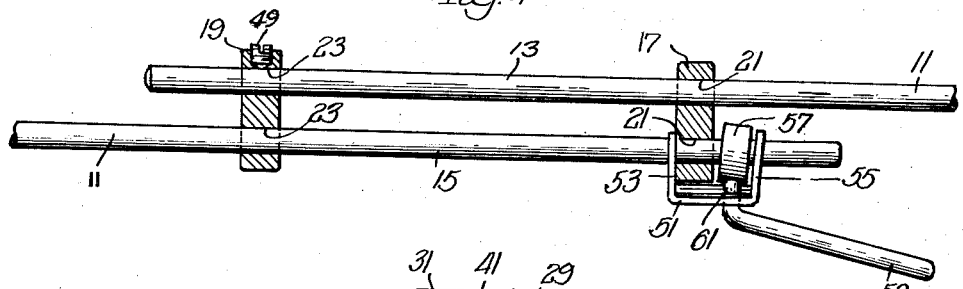
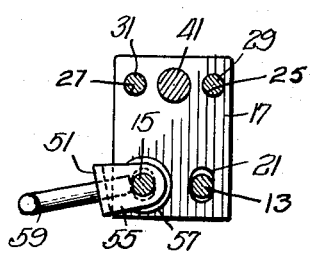
INVENTOR.
David S. Swarthout,
BY

United States Patent Office 2,849,060
Patented Aug. 26, 1958

2,849,060
TREAD COMPRESSING TYPE TIRE BEAD SEATING TOOL

David S. Swarthout, Chicago, Ill.

Application February 17, 1955, Serial No. 488,800

1 Claim. (Cl. 157—1.21)

This invention relates to a new and improved tire tool and more particularly to a tool especially adapted for use with tubeless tires.

Tubeless tires are now in wide used and in contradistinction to the older tubeless tires which were complete tubes, the present tires comprise spaced beads and the rim between the beads serves to retain air in the tire. With such tires it is essential that the beads make and maintain airtight contact with the adjacent rim surfaces. For this purpose the beads are normally provided on their outer, generally vertical surfaces with circumferentially extending ridges of soft rubber or the like which are compressed against the inner lateral faces of the rim sides when the tire is inflated. These ridges must be held against the rim surfaces with substantial pressure before they provide an airtight seal.

It will be understood that the air inlet valve normally extends through the lower portion of the drop-center rims which are provided for mounting the tires. It is not possible to merely place the tire on the rim and start inflation as the tire does not make airtight contact with the rim. It is necessary therefore to provide mechanical means for forcing the tire beads outwardly against the rims with sufficient pressure to form an airtight seal before inflation can be begun. Once the internal air pressure has reached an amount adequate to force the bead ridge against the rim with sealing pressure, the mechanical means may be removed and the inflation can then continue until the desired working pressure is attained. It has been found with present types of tubeless tires that an internal pressure of approximately eight pounds per square inch is adequate to insure effective airtight sealing between the bead ridges and the rim.

It is an object of the present invention to provide a tire tool adapted to force the beads of tubeless tires with sealing pressure against rim side walls.

It is a further object to provide a tool of this character which operates by circumferential pressure on the outer face of the central tread portion of a tire sufficient to compress this portion of the tire inwardly in a radial direction.

It is also an object to provide a means to control such radial compression in order to force the tire beads and their sealing ridges in opposite axial directions so as to cause a sealing contact with inner rim faces.

It is an additional object to provide a tire tool of this character which is simple in design and operation and adapted for commercial production and use.

Other and further objects will appear as the description proceeds.

I have shown certain preferred embodiments of my invention in the accompanying drawings in which—

Figure 1 is a plan view of the actuating portion of the device;

Figure 2 is a side elevation, on an enlarged scale, of the actuating portion of the device;

Figure 3 is a longitudinal, vertical section of the construction of Figure 2;

Figure 4 is a transverse, longitudinal section taken on line 4—4 of Figure 2; and Figure 5 is a vertical cross section taken on line 5—5 of Figure 2.

As shown in the drawing, the apparatus comprises a band 11 having overlapping end portions 13 and 15. The tightening and holding means comprises a pair of thrust plates 17 and 19, these plates being substantially identical in construction. Each of the two plates is provided with a pair of parallel openings 21 and 23 respectively, through which the ends 13 and 15 of the band pass. As best shown in Figures 3 and 5, these openings 21 and 23 are somewhat oval in cross section and are also inclined along the general lines of the curvature of the band 11.

The thrust plates 17 and 19 are also provided with pairs of circular openings 25 and 27 adapted to receive the guide bars 29 and 31. These guide bars are shown as positively secured to the thrust plate 19 by means of set screws 33 and 35. The thrust plates 17 and 19 are also provided with threaded openings 37 and 39 to receive the reversely threaded ends 41 and 43 of the thrust bar 45. One end of the thrust bar 45 is provided with a crank 47 by means of which the bar 45 may be rotated. Due to the reversely threaded end portions 41 and 43, rotation of bar 45 will move the thrust plates 17 and 19 toward and away from each other.

As shown in Figure 3, the end 13 of the band is secured to the thrust plate 19 by means of a set screw 49. This end 13 passes freely through an opening 21 in the thrust plate 17. The end 15 passes freely through an opening 23 in thrust plate 19 and through a similar opening 21 in thrust plate 17. A U-shaped member 51 is provided having arms 53 and 55 located upon opposite sides of the thrust plate 17 and having openings through which the band end 15 passes. The collar 57 is fitted on the band end 15 between the thrust plate 17 and the arm 55 of the U-shaped member 51. The clamping lever 59 has an inturned end 61 threaded into the collar 57 with its inner end adapted to have clamping contact with the band end 15 when the lever is tightened.

In the use of the apparatus the band 11 will be placed circumferentially around the center of the tread of the tire which is to be tightened upon the rim. At this time the end 15 of the band will pass loosely through both thrust plates 17 and 19 and also through the arms 53 and 55 of the U-shaped member and through the collar 57. Either before or after placing the band in position, the thrust bar 45 will be rotated by handle 47 so as to bring the thrust plates 17 and 19 adjacent the unthreaded middle portion of the thrust bar 45.

The collar 57 is then clamped to the end 15 of the bar by clockwise rotation of the clamping member 59, as seen in Figure 2. The thrust bar 45 is next rotated to separate the thrust plates 17 and 19. This movement of the plates causes plate 19 to pull on the end 13 of the band, this end being positively held to the thrust plate 19 by set screw 49. The other thrust plate 17 moves against the collar 57 which is tightly clamped to the end 15 of the band and thus pulls on that end of the band. These opposite pulls on the band ends causes the band to contract around the tread of the tire which has the result of forcing the beads of the tire into airtight contact with the rim so that the tire may be inflated. After the air pressure in the tire has reached approximately eight pounds per square inch, the tool may be removed from the tire and inflation of the tire continued.

The device may be removed from the tire quickly and easily merely by unclamping the collar 57 from the end 15. This is accomplished by counter-clockwise movement of the clamping lever 59 as seen in Figure 2. The guiding bars 29 and 31, located on each side of the thrust bar 45, aid in keeping the thrust plates 17 and 19 generally parallel to each other which makes the apparatus work more smoothly and prevents binding of the threads on the thrust member. It also prevents binding of the openings 21 and 23 on the ends of the band when the band is tightened or loosened.

The preferred embodiments of the invention which has been shown and described is to be understood to be illustrative only as the apparatus may be varied in construction to meet differing conditions and requirements and I contemplate such modifications as come within the spirit and scope of the appended claim.

I claim:

A tire tool comprising a band adapted to extend around the outer circumference of a tire, said band having overlapping ends, and tightening and holding means for tightening and holding said band around a tire to thereby circumferentially clamp the tire, said means including a pair of thrust plates, each plate having a spaced pair of parallel openings adjacent their inner edges for receiving the overlapping band ends, means for securing one band end to one thrust plate, and separate means for securing the other band end to the other thrust plate, said separate means comprising a U-shaped member having its arms provided with openings to receive the band end, an arm being located on each side of said other thrust plate, a collar slidably fitted on the band end and located between the plate and one arm of the U-shaped member, manually operable means threaded into the collar for clamping the collar to the band end, and adjustable thrust means coacting with the two thrust plates for moving them apart whereby to tighten the band about a tire.

References Cited in the file of this patent

UNITED STATES PATENTS

| | | |
|---|---|---|
| 397,262 | Williams | Feb. 5, 1889 |
| 704,953 | Auld | July 15, 1902 |
| 745,358 | Lanpher | Dec. 1, 1903 |
| 1,966,580 | Bull | July 17, 1934 |
| 2,684,112 | Coats | July 20, 1954 |